United States Patent
Pulli et al.

(10) Patent No.: US 9,571,818 B2
(45) Date of Patent: Feb. 14, 2017

(54) TECHNIQUES FOR GENERATING ROBUST STEREO IMAGES FROM A PAIR OF CORRESPONDING STEREO IMAGES CAPTURED WITH AND WITHOUT THE USE OF A FLASH DEVICE

(75) Inventors: Kari Pulli, Palo Alto, CA (US); Alejandro Troccoli, San Jose, CA (US); Changyin Zhou, Santa Ana, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 561 days.

(21) Appl. No.: 13/490,991

(22) Filed: Jun. 7, 2012

(65) Prior Publication Data

US 2013/0329015 A1    Dec. 12, 2013

(51) Int. Cl.
*H04N 13/02* (2006.01)
*G06K 9/60* (2006.01)
(Continued)

(52) U.S. Cl.
CPC ......... *H04N 13/0239* (2013.01); *G06T 7/0075* (2013.01); *H04N 13/0253* (2013.01);
(Continued)

(58) Field of Classification Search
None
See application file for complete search history.

(56) References Cited

U.S. PATENT DOCUMENTS

| 6,215,898 B1 * | 4/2001 | Woodfill | G06K 9/32 |
| | | | 348/47 |
| 2003/0197708 A1 * | 10/2003 | Frisken | G01C 11/02 |
| | | | 345/582 |

(Continued)

FOREIGN PATENT DOCUMENTS

| CN | 101512601 A | 8/2009 |
| CN | 101960860 A | 1/2011 |
| TW | I350375 | 10/2010 |

OTHER PUBLICATIONS

M. Okutomi, Y. Katayama and S. Oka, "A simple stereo algorithm to recover precise object boundaries and smooth surfaces," Computer Vision and Pattern Recognition, 2001. CVPR 2001. Proceedings of the 2001 IEEE Computer Society Conference on, 2001, pp. II-138-II-144 vol. 2. doi: 10.1109/CVPR.2001.990938.*

*Primary Examiner* — Gims Philippe
*Assistant Examiner* — Stefan Gadomski
(74) *Attorney, Agent, or Firm* — Artegis Law Group, LLP

(57) ABSTRACT

Techniques for generating robust depth maps from stereo images are described. A robust depth map is generated from a set of stereo images captured with and without flash illumination. The depth map is more robust than depth maps generated using conventional techniques because a pixel-matching algorithm is implemented that weights pixels in a matching window according to the ratio of light intensity captured using different flash illumination levels. The ratio map provides a rough estimate of depth relative to neighboring pixels that enables the flash/no-flash pixel-matching algorithm to devalue pixels that appear to be located at (Continued)

different depths than the central pixel in the matching window. In addition, the ratio map may be used to filter the generated depth map to generate a smooth estimate for the depth of objects within the stereo image.

21 Claims, 7 Drawing Sheets

(51) Int. Cl.
G06T 7/00 (2006.01)
H04N 13/00 (2006.01)
(52) U.S. Cl.
CPC ... *H04N 13/0271* (2013.01); *G06K 2209/401* (2013.01); *G06T 7/0073* (2013.01); *G06T 2207/10012* (2013.01); *G06T 2207/10152* (2013.01); *H04N 2013/0081* (2013.01)

(56) References Cited

U.S. PATENT DOCUMENTS

| | | | |
|---|---|---|---|
| 2003/0197806 A1* | 10/2003 | Perry | G06T 7/0065 348/370 |
| 2007/0263119 A1* | 11/2007 | Shum | H04N 5/2354 348/371 |
| 2008/0297621 A1* | 12/2008 | Sun et al. | 348/224.1 |
| 2009/0324059 A1* | 12/2009 | Boughorbel | 382/154 |
| 2010/0007720 A1* | 1/2010 | Murali | G06T 7/0022 348/47 |
| 2010/0020078 A1* | 1/2010 | Shpunt | 345/420 |
| 2010/0309292 A1* | 12/2010 | Ho | H04N 13/026 348/47 |
| 2011/0044531 A1* | 2/2011 | Zhang et al. | 382/154 |
| 2011/0115886 A1* | 5/2011 | Nguyen | H04N 13/025 348/47 |
| 2011/0242334 A1* | 10/2011 | Wilburn | H04N 5/2354 348/207.1 |
| 2012/0039525 A1* | 2/2012 | Tian et al. | 382/154 |

* cited by examiner

TECHNIQUES FOR GENERATING ROBUST STEREO IMAGES FROM A PAIR OF CORRESPONDING STEREO IMAGES CAPTURED WITH AND WITHOUT THE USE OF A FLASH DEVICE

BACKGROUND OF THE INVENTION

Field of the Invention

The invention generally relates to stereo images and, more specifically, to techniques for generating robust stereo images from a pair of corresponding stereo images captured with and without a light source such as a flash device.

Description of the Related Art

Recently, three-dimensional (3D) stereo images and video have gained popularity in the consumer market. The introduction of a broader selection of 3D content along with the marketing of relatively cheap 3D HDTV (high definition television) sets have made viewing images and video in 3D more common. Equipping computers with sets of cameras and computing depths and spatial relations from stereo image pairs has been well-documented, with applications in 3D modeling, robotic navigation, new image synthesis, augmented reality, and gaming among others. Recently, stereo imaging has shown up in applications as common as hand-held video cameras such as the Fuji® Finepix 3D camera and the Sony® Bloggie 3D camera.

Conventionally, applications generate depth maps from captured stereo images using a basic stereo reconstruction algorithm to generate a depth value for each pixel by comparing projections of scene points across two or more images taken from offset locations. Stated in another way, the stereo reconstruction algorithm is essentially a pixel matching operation. The pixel matching is typically performed by minimizing the sum of squares, maximizing pixel correlation, or by applying a rank or census transform and then matching the ranks or bit strings. These algorithms work fairly well with textured surfaces, but the algorithms have difficulty making accurate matches on surfaces with uniform color. In addition, pixel-matching algorithms may fail proximate to occlusion boundaries because the depth discontinuity at the boundaries will cause local pixels to be different across the different images (i.e., the close surface occludes pixels in the background in one image but a different background object in the other and, therefore, those pixels do not have a corresponding match). One good example of where the conventional algorithm may fail is when a picture is taken through a fine mesh such as a wicker chair or a chain link fence.

Accordingly, what is needed in the art is a more effective approach for generating accurate, per-pixel depth maps associated with stereo images.

SUMMARY OF THE INVENTION

One embodiment of the present invention sets forth a method for generating depth maps from a set of stereo images. The method includes the steps of generating a ratio map associated with a first image in the set of stereo images and a corresponding second image in the set of stereo images, where the first image is captured by a first image sensor using ambient illumination and the second image is captured by the first image sensor using flash illumination. The first image corresponds to a third image captured by a second image sensor substantially simultaneously with the first image being captured by the first image sensor. Similarly, the second image corresponds to a fourth image captured by the second image sensor substantially simultaneously with the second image being captured by the first image sensor. The method further includes the steps of generating a disparity map associated with the second image based on a comparison of the second image and the fourth image, and generating a depth map associated with the second image. The method may also include the steps of generating a ratio map associated with the third image and the fourth image, generating a disparity map associated with the fourth image, and generating a depth map associated with the fourth image. For each pixel in the second image, the ratio map associates the pixel with a ratio of a first intensity value for the pixel based on the second image to a second intensity value for a corresponding pixel based on a first image, the disparity map associates the pixel with a disparity value according to a pixel-matching algorithm that compares pixels in the second image to corresponding pixels in the fourth image, where the pixel-matching algorithm includes at least one calculation based on the ratio associated with the pixel, and the depth map associates the pixel with a depth value that is calculated based on the disparity value associated with the pixel, a focal length, and a baseline offset distance.

Another embodiment of the present invention sets forth a computer-readable storage medium including instructions that, when executed by a processing unit, cause the processing unit to perform operations for generating depth maps from a set of stereo images, according to the method set forth above. Yet another embodiment of the present invention sets forth a system for generating depth maps from a set of stereo images. The system includes a memory and a processor. The memory is configured to store the set of stereo images captured by two or more image sensors, which include a first image that is captured by a first image sensor using ambient illumination, a second image that is captured by the first image sensor using flash illumination, a third image captured by a second image sensor substantially simultaneously with the first image being captured by the first image sensor, and a fourth image captured by the second image sensor substantially simultaneously with the second image being captured by the first image sensor. The processor is coupled to the memory and configured to perform operations for generating depth maps from a set of stereo images, according to the method set forth above.

One advantage of the disclosed system is that the stereo-vision camera does not require a high degree of calibration of the light source position or intensity profile to generate robust depth maps. The technique described herein may be implemented in many low-cost handheld devices. Simply comparing the ratio of captured light intensity using different degrees of illumination provides information that can be used to effectively match pixels corresponding to the same surfaces and to differentiate between pixels located at different depths in the pixel-matching algorithms.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
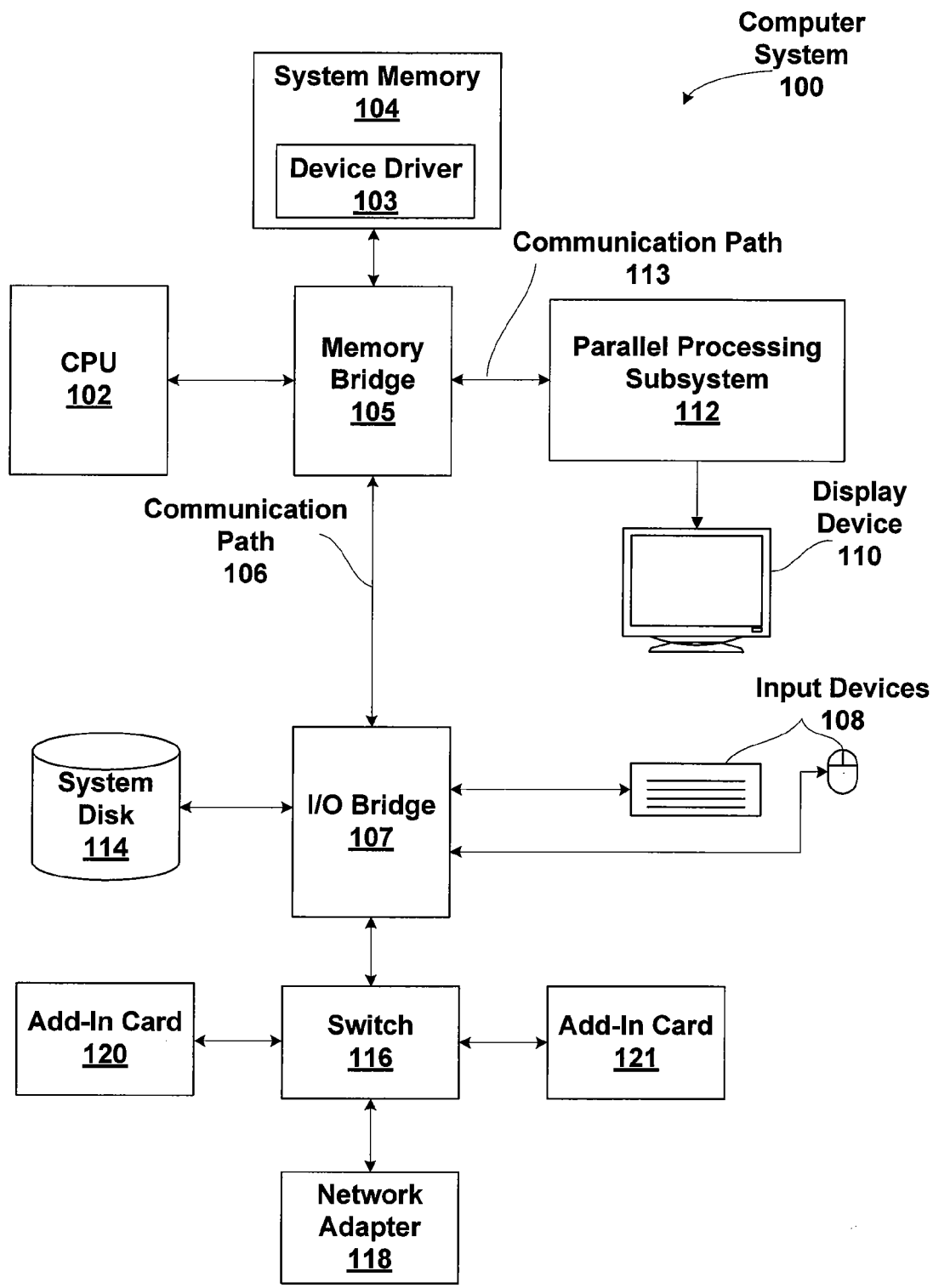
FIG. 1 is a block diagram illustrating a computer system configured to implement one or more aspects of the present invention.

FIG. 1 is a block diagram illustrating a computer system 100 configured to implement one or more aspects of the present invention. The computer system 100 may be a desktop computer, laptop computer, handheld device, cellular phone, PDA (personal digital assistant), tablet computer, camera, or other well-known types of consumer electronic devices.

As shown in FIG. 1, computer system 100 includes, without limitation, a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect Express (PCIe), Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communications paths 106 and 113, may be implemented using any suitable protocols, such as PCI Express, AGP (Accelerated Graphics Port), HyperTransport, or any other bus or point-to-point communication protocol (s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
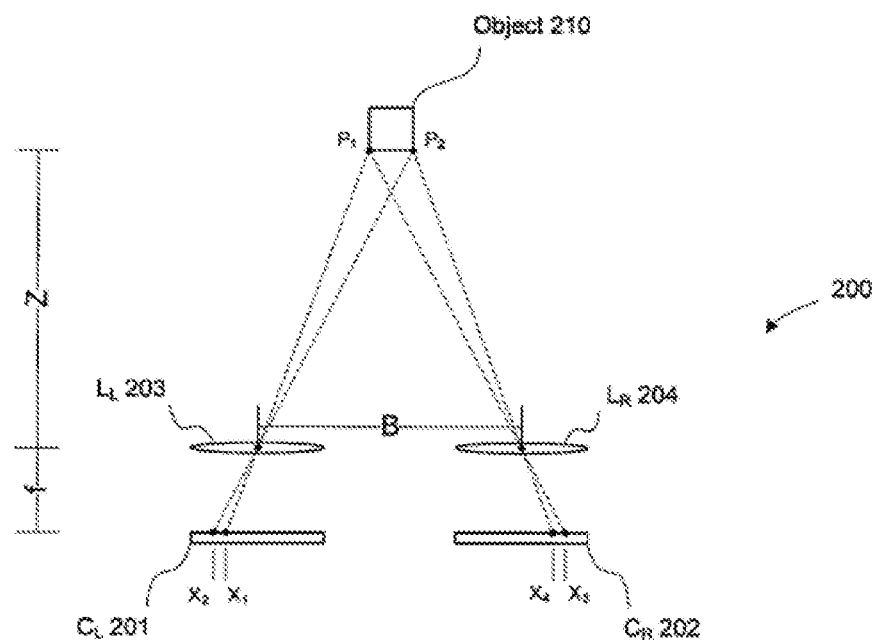
FIG. 2 details the basic geometry of a stereo-vision camera, according to one embodiment of the present invention.

FIG. 2 details the basic geometry of a stereo-vision camera 200, according to one embodiment of the present invention. The stereo-vision camera 200 may include one or more elements of computing system 100. For example, stereo-vision camera may include a CPU 102 and a system memory 104 connected by a system bus. The stereo-vision camera 200 may also include a parallel processing subsystem 112 for processing image data. In one embodiment, the stereo-vision camera includes the CPU 102 and the GPU 112 on the same integrated circuit to form a SoC. The stereo-vision camera 200 may also include applications or firmware stored in system memory 104 that, when executed by CPU 102 or GPU 112, enable the stereo-vision camera 200 to process stereo images and generate depth maps, as described more fully below. Furthermore, the elements of stereo-vision camera may be included within computing system 100, such as by including two image sensors in a tablet computer, cellular phone, or other handheld device.

As shown in FIG. 2, a stereo-vision camera 200 may also include two or more offset image sensors that enable the stereo-vision camera 200 to capture a set of stereo images. In one embodiment, the digital images may be stored in system memory 104 or some other non-volatile memory, which may or may not be removable. The images may be stored in memory via a non-compressed format, such as the 32 bpp BMP (bitmap) format, or a compressed format, such as a JPEG (Joint Photographic Experts Group) format. The stereo-vision camera 200 may then process the images read from memory 104. In another embodiment, the raw image sensor data may be processed via a stereoscopic image processing pipeline directly after being read from the image sensors. The processed data may then be written out to system memory 104 in one of the available formats.

FIG. 2 further illustrates capturing a stereoscopic image pair using two image sensors. A left image sensor ($C_L$) 201 captures a left image and a right image sensor ($C_R$) 202 captures a right image substantially simultaneously. Each image sensor 201, 202 may be paired with a lens that focuses light onto the surface of the image sensor. For example, as shown, a left lens 203 is paired with the left image sensor 201 and a right lens 204 is paired with the right image sensor 202. Although not explicitly shown in FIG. 2, each image sensor may be integrated into an image sensor assembly that includes a lens, an image sensor, a shutter mechanism, and one or more filters such as polarizing filters or color filters that may or may not be removable. In one embodiment, the image sensors 201, 202 may be CMOS (complementary metal oxide semiconductor) image sensors. In another embodiment, the image sensors 201, 202 may be CCD (charge coupled device) image sensors.

In a typical configuration, the image sensors 201, 202 are offset in a first dimension by a baseline (B) offset distance. The baseline offset is what allows the captured images to be analyzed to determine the depth associated with objects in a corresponding stereoscopic image pair. For example, as shown in FIG. 2, an object 210 is shown at a position within the overlapping field of vision for the left image sensor 201 and the right image sensor 202. The object is a distance (Z) from the surface of the lenses 203, 204 of the stereo-vision camera 200. The lenses 203, 204 are associated with a focal length (f), which is the distance from the lenses 203, 204 to a surface of the image sensor (i.e., the focal plane) at which all collimated light passing through the lens converges to a single point on the image sensor. The focal length is related to the geometry and material of the lenses 203, 204. As is well known to those of skill in the art, the focal length and the shape of the field of view (FOV) are inversely proportional. In other words, as the focal length of the optical system is decreased, the field of view of the optical system increases. The lenses 203, 204 will be located at a position in front of the image sensor that is equal to the focal length (f) such that light passing through the lens is focused on the image sensor.

As a user captures an image, light reflected off the surface of object 210 is projected onto the surface of the image sensors 201, 202. The front left corner ($P_1$) of the object 210 is projected onto the left image sensor 201 at a first pixel position $X_1$ and the front right corner ($P_2$) of object 210 is projected onto the left image sensor 201 at a second pixel position $X_2$. Similarly, the front left corner ($P_1$) of the object 210 is projected onto the right image sensor 202 at a third pixel position $X_3$ and the front right corner ($P_2$) of object 210 is projected onto the right image sensor 202 at a fourth pixel position $X_4$. It will be appreciated that, depending on the configuration of the lens (or lenses), the image captured by sampling the image sensors 201, 202 may be inverted in both the horizontal (as shown in FIG. 2) and vertical directions. The stereo-vision camera 200 may be configured to correct the inversion by sampling pixels in the reverse order.

As also shown in FIG. 2, the projected position of the object 210 in the left and right images are not identical due to the relative position of object 210 with respect to the location of the image sensors 201, 202. This effect is called parallax and is exploited by stereo vision systems to enable users to experience a 3D effect. In other words, light from objects located far away from the camera (i.e., in the background) pass through the left lens 203 and right lens 204 at approximately the same angle and are projected onto the same pixel location in the left image sensor 201 and the right image sensor 202. Conversely, light from objects located closer to the camera pass through the left lens 203 and the right lens 204 at different angles and, therefore, are projected to different pixel locations on the image sensors 201, 202. The disparity in the projected pixel positions will always be in the same dimension (e.g., horizontal) as the baseline offset between the image sensors 201, 202. This disparity (D) between the pixel positions of a projected point in the left image and the same projected point in the right image enables a processing unit to analyze the captured images to estimate a depth associated with the different points (i.e., pixels) within the scene. Calculating the disparity (D) for the projected pixel locations of the front left corner (P1) and the front right corner (P2) of object 210 is performed by solving Equations 1 and 2, respectively, as shown below.

$$D(P_1)=x_1-x_3 \quad (Eq. 1)$$

$$D(P_2)=x_2-x_4 \quad (Eq. 2)$$

As shown, $x_1$ and $x_2$ are dimensions measured from the left edge of the left stereo image captured via the left image sensor 201 and $x_3$ and $x_4$ are dimensions measured from the left edge of the right stereo image captured via the right image sensor 202. It will be appreciated that the left edge of the captured stereo images may not correspond to the left-most pixels of the corresponding image sensor. Calibration of the stereo-vision camera 200 may be performed to rectify the left image and the right image such that the left-most pixel in the left stereo image corresponds to the left-most pixel of the right stereo image in the horizontal direction for light emanating from an object located in the background.

Given the calculated disparities (D) of the front left corner (P1) and the front right corner (P1) of object 210, calculating the depths (Z) for the front left corner (P1) and the front right corner (P1) of object 210 is performed by solving Equations 3 and 4, respectively, as shown below.

$$Z(P_1) = \frac{f \cdot B}{D(P_1)} = \frac{f \cdot B}{x_2 - x_3} \quad (Eq. 3)$$

$$Z(P_2) = \frac{f \cdot B}{D(P_2)} = \frac{f \cdot B}{x_2 - x_4} \quad (Eq. 4)$$

The focal length (f) and the baseline (B) are known constants defined based on the configuration of the image sensors 201, 202 and the lenses 203, 204 implemented in the stereo-vision camera 200. Therefore, as Equations 3 and 4 make clear, the depth is inversely proportional to the amount of disparity between corresponding pixels in the left and right image. Consequently, calculating the depths for each pixel of a left or right image is performed by matching each pixel in one image to a corresponding pixel in the other image, calculating the disparities between corresponding matching pixel locations, and determining the depth of each pixel based on the calculated disparity. In practice, however, many problems are encountered when attempting to match the pixel locations in each image. For example, conventional pixel-matching algorithms typically utilize a window function to match a small window of pixels in one image to a similar window of pixels in the corresponding image. However, near depth discontinuity borders (i.e., where the window may include pixels associated with multiple surfaces located at different depths), the windows around the actual corresponding pixels may be different due to occlusion caused by the different spatial locations of the image sensors and objects in the scene. Furthermore, matching windows may be difficult on uniform surfaces where multiple potential windows within the search extents may share similar characteristics. Typically, conventional pixel-matching algorithms provide low quality depth maps that tend to have poor resolution at object edges.

Flash/No-Flash Stereo System

Figure 3:
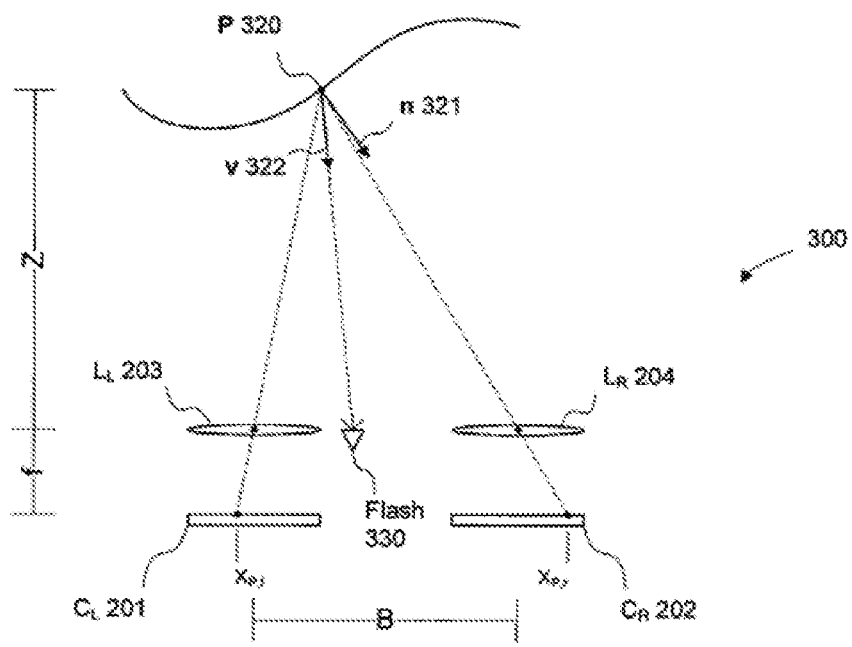
FIG. 3 illustrates a stereo-vision camera for capturing flash/no-flash stereo image pairs, according to one embodiment of the present invention.

FIG. 3 illustrates a stereo-vision camera 300 for capturing flash/no-flash stereo image pairs, according to one embodiment of the present invention. As shown in FIG. 3, stereo-vision camera 300 is similar to stereo-vision camera 200. However, stereo-vision camera 300 includes a flash device 330 located proximate to the image sensors 201, 202. The flash device 330 may be a conventional flash device such as an electronic flashtube filled with xenon gas and excited by a high voltage discharge to emit a short flash or pulse of light. It will be appreciated that the flash device 330 may be any conventional flash device that is capable of emitting a short burst of light to illuminate a scene. Precise positioning of the flash device 330 relative to the location of the image sensors 201, 202 (and the corresponding calibration required) is not important in order to implement certain aspects of the present invention. Conventional photometric depth calculation techniques require high degrees of calibration in order to determine the depth of objects within the scene. For example, sampling or controlling the ambient light conditions and the intensity and positioning of the flash device may be required. The flash/no-flash technique described herein does not require the same degree of calibration to generate robust depth maps.

In order to generate a robust stereo image using a stereo-vision camera 300, two pairs of stereo images should be captured, a first stereo image pair (referred to herein as $G_l$ and $G_r$) and a second stereo image pair (referred to herein as $F_l$ and $F_r$). The first stereo image pair ($G_l$, $G_r$) does not rely on the flash device 330 to illuminate the scene, instead relying on the ambient light to illuminate the scene. The second stereo image pair ($F_l$, $F_r$) relies on the flash device 330 as well as the ambient light to illuminate the scene. In alternate embodiments, more than two image sensors may be implemented to capture N-view 3D images (e.g., for use with auto-stereoscopic displays). For purposes of illustration, the present disclosure refers to 2-view stereoscopic images, but the techniques described herein may be extended to alternative embodiments using N-view implementations.

It will be appreciated that the stereo-vision camera 300 may be calibrated to rectify the digital images captured with the left image sensor 201 and the right image sensor 202 such that any surface point visible to both cameras projects to the same scanline (i.e., in the vertical dimension) in the captured images. In other words, the captured images may correspond to a subsection of the pixels of the image sensors 201, 202 such that a margin of pixels on the edges of the image sensors does not contribute to the pixels of the captured images. Furthermore, the number of pixels in the margins of the left image sensor 201 may be different than the number of pixels in the corresponding margins of the right image sensor 202. For example, the upper margin of the left image sensor 201 may be larger than the upper margin of the right image sensor 202 to correct for misalignment in the vertical direction of the image sensors 201, 202 as installed in the stereo-vision camera 300. Furthermore, the left and right margins of the left image sensor 201 and the right image sensor 202 may be adjusted such that a point located at a distance (Z) of infinity from the stereo-vision camera 300 (i.e., a sufficiently large distance that the rays reflected from the object arrive at both the left lens 203 and the right lens 204 substantially in parallel) is aligned at the horizontal boundary of the captured image. Calibrating the stereo-vision camera 300 in such a manner ensures that images located in the background of the scene have a disparity of zero.

In order to evaluate the depth (Z) for a point P 320 located on a surface of an object in the scene, two sets of stereo image pairs are analyzed. Assuming that the surface of the object on which point P is located approximates a Lambertian surface (i.e., where light reflected by the surface is scattered such that the apparent brightness of the surface to an observer is the same regardless of the observer's angle of view), the measured intensity of light reflected from point P to each of the image sensors 201, 202 during capture of the no-flash stereo image pair ($G_l$, $G_r$) is given by G(P) in Equation 5.

$$G(P) = \eta \cdot I_a \cdot R_s \quad \text{(Eq. 5)}$$

As shown in Equation 5, the intensity of light G(P) at point P in the no flash stereo image pair ($G_l$, $G_r$) relates to ambient illumination, surface shape, and reflectivity by the relationship set forth above, where $\eta$ is a proportionality constant between measured irradiance and scene radiance, $I_a$ is the intensity of ambient illumination at point P, and $R_s$ is the surface reflectivity at point P. In contrast, the measured intensity of light reflected from point P to each of the image sensors during capture of the flash stereo image pair ($F_l$, $F_r$) is given by F(P) in Equation 6.

$$F(P) = (\eta \cdot I_a \cdot R_s) + \left(\eta \cdot I_f \cdot \frac{\langle \hat{n} \cdot \hat{v} \rangle}{r^2} \cdot R_s\right) \quad \text{(Eq. 6)}$$

As shown in Equation 6, the intensity of light F(P) at point P in the flash stereo image pair ($F_l$, $F_r$) relates to ambient illumination, flash illumination, surface shape, and reflectivity by the relationship set forth above, where $\eta$ is a proportionality constant between measured irradiance and scene radiance, $I_a$ is the intensity of ambient illumination at point P, $R_s$ is the surface reflectivity at point P, $I_f$ is the intensity of the flash, r is the distance from point P to the flash, and <n·v> is the inner product between the surface normal vector n 321 and the direction vector to the flash v 322. For a corresponding pair of flash/no-flash images for either the left image sensor 201 or right image sensor 202, we can measure G(P) and F(P) by analyzing the captured intensity values of each color component for pixels in the corresponding stereo images.

The accuracy of the measurement assumes that the scene is static, which may be approximated by capturing the flash and no-flash images substantially simultaneously. For example, stereo-vision camera 300 may be capable of exposing the image sensors 201, 202 to ambient light without a flash for $\frac{1}{100}$ of a second. The stereo-vision camera 300 then closes the shutter and samples the image sensors to capture the no-flash stereo image pair ($G_l$, $G_r$). A few tenths of a second later, the stereo-vision camera 300 exposes the image sensors 201, 202 to ambient light with a flash for $\frac{1}{100}$ of a second, closes the shutter, and samples the image sensors to capture the flash stereo image pair ($F_l$, $F_r$). Because both sets of stereo image pairs are captured within a few tenths of a second, similar pixels in the left image sensor 201 or the right image sensor 202 correspond to similar points on objects in both the no-flash stereo image pair ($G_l$, $G_r$) and the flash stereo image pair ($F_l$, $F_r$), assuming that the scene does not include fast moving objects. In one embodiment, small motion between the capture of corresponding stereo image pairs may be corrected by calculating a transformation (typically a homography) that aligns the flash stereo image pair ($F_l$, $F_r$) with the no-flash stereo image pair ($G_l$, $G_r$).

By taking the ratio of the captured intensity values for the components of each pixel in the corresponding flash/no-flash images for both the left image sensor 201 and the right image sensor 202, a pair of ratio maps ($R_l$, $R_r$) are generated that compare the difference between the brightness of pixels in the stereo image pairs captured with and without flash illumination. In one embodiment, a ratio map is defined for a flash/no-flash stereo image as the log of the ratio between the intensity of light $F(P)$ at any point P in the flash stereo image pair ($F_l$, $F_r$) and the intensity of light $G(P)$ at the point P in the no-flash stereo image pair ($G_l$, $G_r$), as shown below in Equation 7.

$$R(P) = \log\left(\frac{F(P)}{G(P)}\right) = \log\left(1 + \frac{I_f}{I_a} + \frac{\langle \hat{n} \cdot \hat{v} \rangle}{r^2}\right) \quad \text{(Eq. 7)}$$

As shown in Equation 7, the ratio map for any point P is independent of surface reflectivity $R_s$ and varies based on the surface normal vector n 321, direction vector to the flash v 322, and object distance r. This independence still holds even if the exposure time ($t_f$, $t_r$) of the flash and no-flash images are different and even if Gamma correction has been applied, as illustrated by Equation 8.

$$R(P) = \log\left(\frac{[t_f \cdot F(P)]^\gamma}{[t_r \cdot G(P)]^\gamma}\right) = \gamma \cdot \left\{\log\left(\frac{t_f}{t_r}\right) + \log\left(\frac{F(P)}{G(P)}\right)\right\} \quad \text{(Eq. 8)}$$

In one embodiment, to avoid a calculation that results in a division by zero, the ratio map is defined by equation 9, where $\epsilon$ is some small number.

$$R(P) = \log(F(P) + \epsilon) - \log(G(P) + \epsilon) \quad \text{(Eq. 9)}$$

The ratio map ($R_l$, $R_r$) is essentially independent of scene albedo and is instead related to distance from the flash device 330 and local surface orientation. Although the calculation is not completely accurate for non-Lambertian surfaces, neighboring pixels with similar ratio values are likely to originate from the same surface. For example, a point O proximate to point P on the surface shown in FIG. 3 will have approximately similar ratio values because the surface normal vector n for point O is similar to the surface normal vector n for point P, the direction vector v for point O is similar to the direction vector v for point P, and the distance r from point O to the flash is similar to the distance r from point P to the flash. Thus, the ratio values for proximate pixels of the same surface should be similar. If the ratio values for proximate pixels are not similar, then that may indicate that the pixels are located proximate to a depth boundary (i.e., the pixels are associated with different surfaces of different objects located at different depths) or that the pixels are located proximate to an edge of the object where the surface normal orientation changes abruptly.

Figure 4:
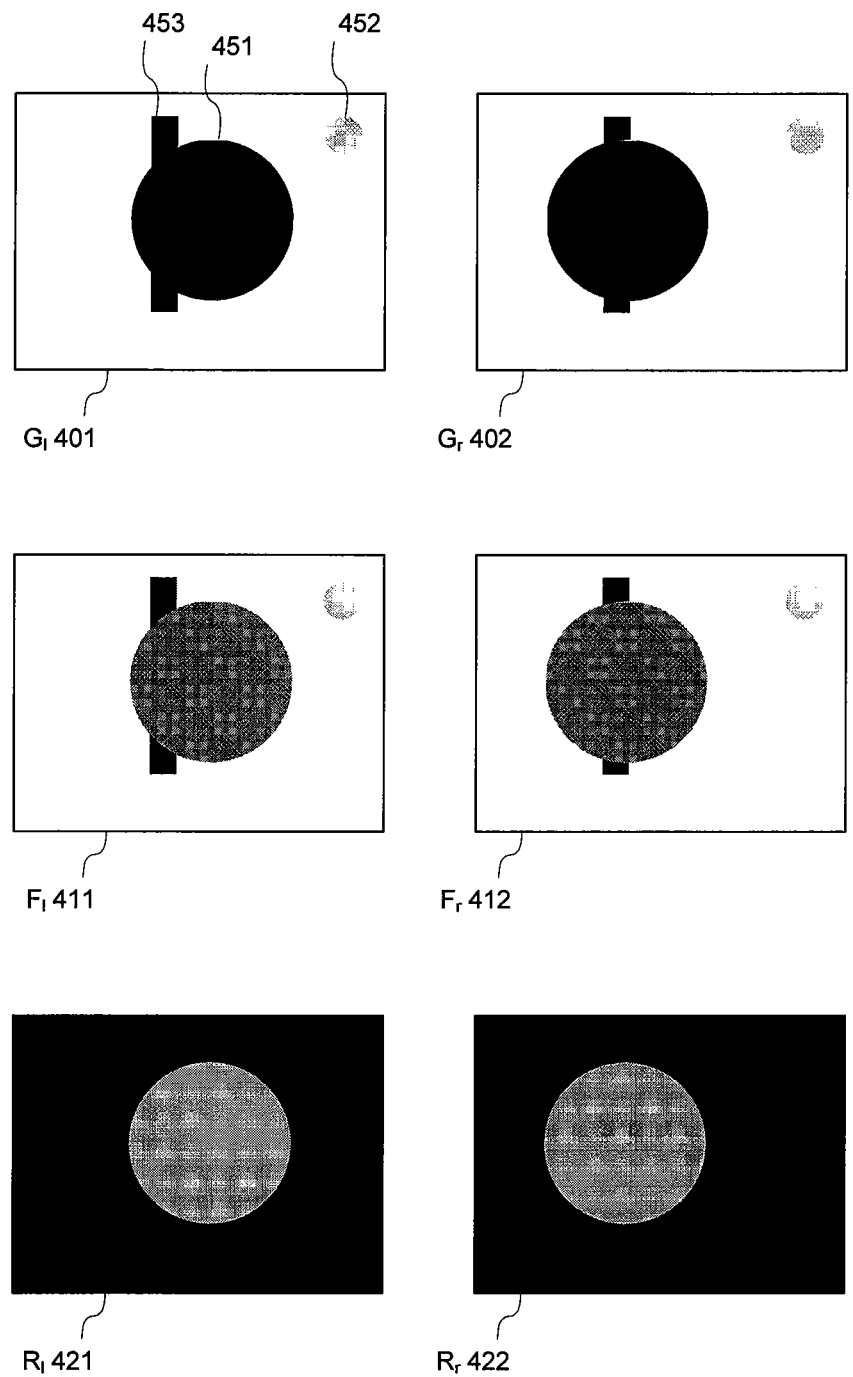
FIG. 4 illustrates an example of a flash/no-flash stereo image pair and the corresponding ratio maps, according to one embodiment of the present invention.

FIG. 4 illustrates an example of a flash/no-flash stereo image pair and the corresponding ratio maps ($R_l$, $R_r$), according to one embodiment of the present invention. A first stereo image pair $G_l$ 401 and $G_r$ 402 is captured without illumination from the flash device 330. A short time later, a second stereo image pair $F_l$ 411 and $F_r$ 412 is captured with illumination from the flash device 330. As shown in images 401, 402, 411, and 412, a first object 451 is located in the foreground of the scene and, therefore, the light projected onto pixels of the image sensors 201, 202 corresponding with the first object 451 is associated with a non-zero disparity between the pixel positions corresponding to the left and right stereo images. A second object 452 is located in the background of the scene and, therefore, the light projected onto pixels of the image sensors 201, 202 corresponding to the second object 452 is associated with a zero disparity between the pixel positions corresponding to the left and right images. A third object 453 is located at a depth (Z) that is less than the depth of object 452 and is greater than the depth of object 451. Therefore, the light projected onto pixels of the image sensors 201, 202 corresponding to the third object 453 is also associated with a non-zero disparity between the pixel positions corresponding to the left and right images. However, the disparity associated with the pixel positions corresponding with the third object 453 is less than the disparity associated with the pixel positions corresponding with the first object 451 and, therefore, the relative positioning of the first object 451 and the third object 453 is not the same in the left and right images.

As shown in FIG. 4, the intensity of light projected on the pixels associated with objects in the foreground of the scene is higher in the second stereo image pair $F_l$ 411 and $F_r$ 412 than the intensity of light projected on the pixels associated with objects in the foreground of the scene in the first stereo image pair $G_l$ 401 and $G_r$ 402. In addition, the intensity of light projected on the pixels associated with objects in the background of the scene in the second stereo image pair $F_l$ 411 and $F_r$ 412 is substantially the same as the intensity of light projected on the pixels associated with objects in the background of the scene in the first stereo image pair $G_l$ 401 and $G_r$ 402. The illumination provided by the flash device 330 will reflect higher intensity light from objects closer to the flash device 330, as reflected by Equation 6 (i.e., the intensity of light related to illumination from the flash device is inversely proportional to the square of the distance of an object from the flash device 330).

As also shown in FIG. 4, the ratio maps ($R_l$, $R_r$) corresponding to the left image sensor 201 and the right image sensor 202 generated from the flash/no-flash stereo image pairs, referred to herein as $R_l$ 421 and $R_r$ 422, respectively, show larger differences (i.e., ratio values) between light intensity values for objects located at shallower depths (i.e., in the foreground of the scene) than objects at deeper depths (i.e., in the background of the scene). For example, the ratio maps $R_l$ 421 and $R_r$ 422 reflect that object 451 is closer to the stereo-vision camera 300 than object 453 because the difference in light intensity for pixels associated with object 451 is larger (displayed as a lighter color such as white or gray) than the difference in light intensity for pixels associated with object 453 (displayed as a darker color to reflect smaller changes in light intensity values). Similarly, the ratio maps $R_l$ 421 and $R_r$ 422 reflect that object 452 is located at a depth sufficiently large such that the change in light intensity reflected from object 452 due to the illumination of the flash device 330 is negligible.

The ratio maps may be used for generating a disparity space image (DSI) for each pixel in the second stereo image pair $F_l$ 411 and $F_r$ 412. A disparity space image is a vector of cost values associated with potential disparity values for a given pixel x. In other words, the disparity space image calculates a cost value associated with estimating the pixel in one image to be located at each discrete depth location, where the cost value takes into account the ratio maps ($R_l$, $R_r$). The cost value is calculated based on the similarity between the pixels included within a window centered on pixel x in the left flash stereo image $F_l$ 411 and the pixels included within a corresponding search window centered on a disparate pixel in the right flash stereo image $F_r$ 412. In one embodiment, the disparity space image is computed based on Equation 10, set forth below.

$$C(x, d) = \sum_{|\Delta| < r} \underbrace{N_{\sigma_\Delta}(\Delta)}_{1^*} \cdot \underbrace{N_{\sigma_R}(dR)}_{2^*} \cdot |dF|^2, \Delta = \langle u, v \rangle \quad \text{(Eq. 10)}$$

$$dR = R_l(x + \Delta) - R_l(x) \quad \text{(Eq. 11)}$$

$$dF = F_l(x + \Delta) - F_r(x - D + \Delta) \quad \text{(Eq. 12)}$$

In Equation 10, $\Delta$ is an offset in pixels within the search extents (r) of the pixel matching window, r is the maximum radius of the offset (e.g., for a 7 pixel by 7 pixel search window, r is equal to 3), dR is the difference in the ratio values for an offset pixel (x+$\Delta$) within the window in the left stereo image $F_l$ 411 and the given pixel (x) in the left stereo image $F_l$ 411, and dF is the difference in the intensity of light between the offset pixel (x+$\Delta$) in the left stereo image $F_l$ 411 and a corresponding offset pixel (x−D+$\Delta$) in the right stereo image $F_r$ 412 based on the search window. The first coefficient (1*) is a value derived from a Gaussian function with a standard deviation ($\sigma_\Delta$) related to the size of the window and the offset ($\Delta$) within the window. An example of a Gaussian function for the first coefficient (1*) is given below in Equation 13, where u and v are pixel unit distances from the center of the window to the pixel associated with the offset ($\Delta$). It will be appreciated that Equation 13 is constant for a given window size and standard deviation ($\sigma_\Delta$) and, therefore, a matrix may be pre-calculated to generate a plurality of first coefficients (1*) to apply to each pixel in the window.

$$N_{\sigma_\Delta}(\Delta) = \frac{1}{2 \cdot \pi \cdot \sigma_\Delta^2} e^{-\frac{u^2 + v^2}{\sigma_\Delta^2}}, \Delta = \langle u, v \rangle \quad \text{(Eq. 13)}$$

Similarly, the second coefficient (2*) is a value derived from a Gaussian function related to the local range of the ratio map proximate to pixel x. An example of a Gaussian function for the second coefficient (2*) is given below in Equation 14, where the standard deviation ($\sigma_R$) is a function dependent on the local range of the ratio map around pixel x.

$$N_{\sigma_R}(dR) = \frac{1}{2 \cdot \pi \cdot \sigma_R^2} e^{-\frac{dR^2}{\sigma_R^2}} \quad \text{(Eq. 14)}$$

In other words, the size of the matching window and the range of the values in a local region of the generated ratio map determine how pixels are weighed when calculating the cost value for choosing a disparity value of D for a given pixel x.

Figure 5A:
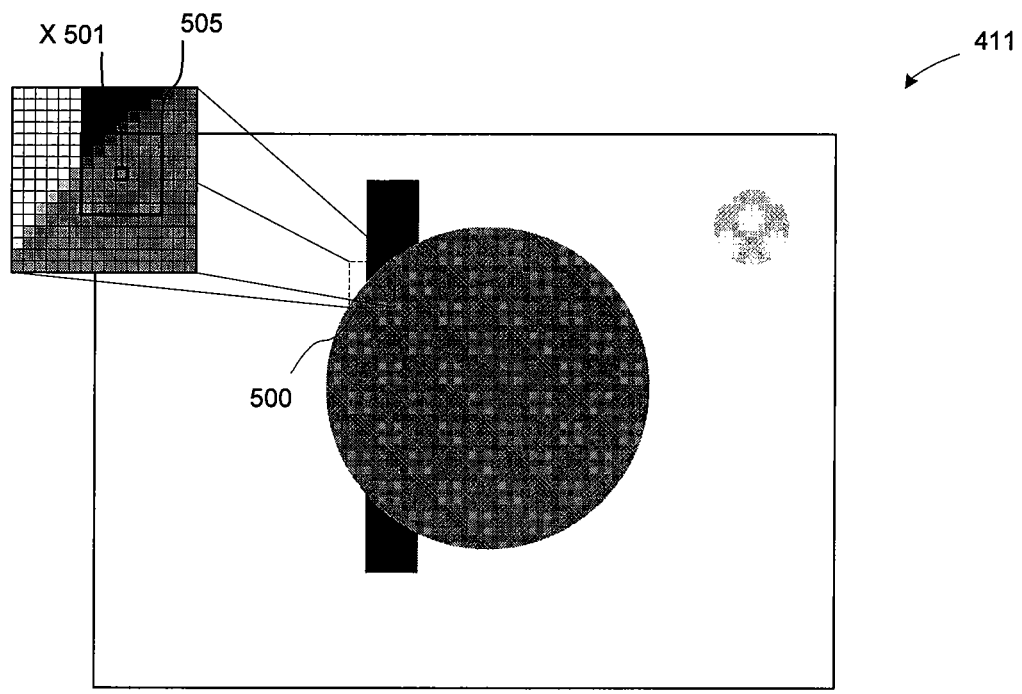
FIGS. 5A and 5B illustrate a pixel-matching algorithm for calculating a disparity space image (DSI) associated with a pixel, according to one embodiment of the present invention.
Figure 5B:
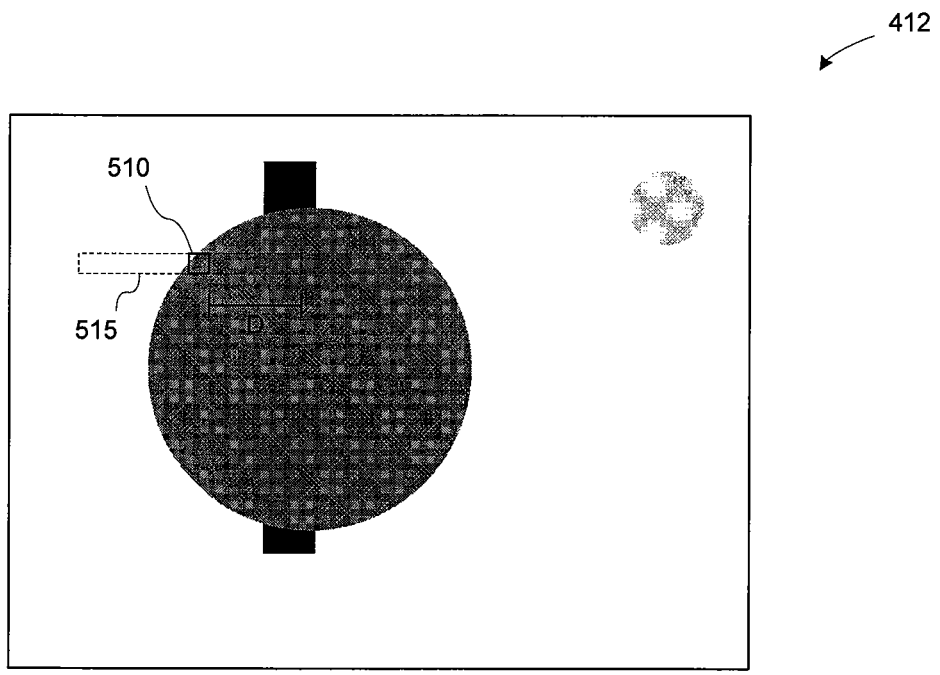

FIGS. 5A and 5B illustrate a pixel-matching algorithm for calculating a disparity space image (DSI) associated with a pixel x 501, according to one embodiment of the present invention. For purposes of illustration, the flash stereo images $F_l$ 411 and $F_r$ 412 are 256 pixels in width in the horizontal or x-dimension and 192 pixels in height in the vertical or y-dimension. As shown in FIG. 5A, pixel x 501 has a location index of <98 px, 52 px> relative to the origin of the image $F_l$ 411 located in the upper left corner of the image. A detail view of a 16 pixel by 16 pixel window 500 is blown up to provide a better view of the proximate pixels to pixel x 501 in the left flash stereo image $F_l$ 411. In one embodiment, calculating the disparity space image for pixel x 501 is implemented using a pixel-matching algorithm as described above. A window 505 in the left flash stereo image $F_l$ 411 is shown in FIG. 5A that is 7 pixels by 7 pixels in size centered on pixel x 501, as used in one embodiment of the pixel-matching algorithm.

The size of the window may be chosen based on the available processing capacity of stereo-vision camera 300. Larger window sizes require more calculations for each cost value associated with a pixel x 501 and a given disparity D (i.e., C(x, D) as shown in Equation 10). Smaller window sizes require fewer calculations for each cost value. For example, given the 7×7 window 505 illustrated in FIG. 5A, calculating a cost value includes the summation of 49 different terms, where each term requires a look-up operation for determining a first coefficient (1*) related to the size of the matching window, a calculation related to determining dR (requiring two look-up operations within the ratio map $R_l$ 421), a calculation for determining dF (requiring two look-up operations within the corresponding flash stereo image pair $F_l$ 411 and $F_r$ 412), a calculation or look-up operation for determining a second coefficient related to the range of the ratio map, and a multiplication operation to determine the term from the first coefficient, the second coefficient, and the square of dF. Although the cost value calculation may be costly in terms of the number of computations, it will be appreciated that reducing the window size too much may result in less accurate disparity space images.

As shown in FIG. 5B, box 515 shows the maximum search extents for matching the pixels of window 505 in the left flash stereo image $F_l$ 411 to the pixels in a plurality of potential search windows (e.g., window 510) in the right flash stereo image $F_r$ 412. Each potential search window is offset from the corresponding location for pixel x 501 by a disparity D. It will be appreciated that for any pixel x 501 in the left flash stereo image $F_l$ 411, the corresponding disparate pixel (x−D) in the right flash stereo image Fr 412 should be located at the same location as pixel x 501 or some distance D to the left of pixel x 501. In one embodiment, the search extents may be limited to some maximum amount of disparity $D_{max}$, such as 64 pixels, that is related to a minimum depth $Z_{min}$ for any pixel in the stereo image pair $F_l$ 411 and $F_r$ 412. In another embodiment, the search extents may be unlimited and the pixel-matching algorithm will calculate the cost value for each pixel to the left of the pixel location corresponding to pixel x 501, up to and including pixels at the edge of the right flash stereo image $F_r$ 412. In yet another embodiment, the search extents may be set according to the ratio value ($R_l$) for pixel x 501. For example, small ratio values may indicate that the surface for pixel x 501 is located at a sufficiently large depth and the disparity D for the corresponding matching pixel is expected to be small.

Once the disparity space image is calculated for pixel x 501, an estimate for a disparity D is determined for pixel x 501. In one embodiment, the pixel-matching algorithm implements a winner-take-all (WTA) optimization that determines the estimated disparity for pixel x 501 by finding the minimum cost value in the disparity space image associated with pixel x 501, as illustrated by Equation 15. The selected disparity D for pixel x 501 is the value D that minimizes the cost function (i.e., Equation 10) within the search extents of the window 515. In alternative embodiments, higher quality global methods for estimating a disparity value D for pixels may be implemented, such as a Graph-cut approach or other algorithms known to those skilled in the art. Computing the disparity D for each pixel of the flash stereo image generates a disparity map ($D_l$) that may be used to generate a depth map $Z_l$ for each pixel of the flash stereo image, according to Equations 3 or 4 set forth above.

$$D(x) = \min C(x, D) \qquad (Eq. 15)$$

In one embodiment, in order to estimate a depth Z for occluded surfaces, a left-right-consistency (LRC) technique may be implemented as well. In the LRC technique, a disparity map ($D_l$) for each pixel of the left flash stereo image $F_l$ 411 is generated as described above. A similar operation is performed for pixels of the right flash stereo image $F_r$ 412 to generate a corresponding disparity map ($D_r$), except that the terms for dR and dF of Equation 10 are calculated using Equations 16 and 17 in lieu of Equations 11 and 12 when generating the disparity map ($D_r$) for the right flash stereo image $F_r$ 412. Similarly, the search extents will extend to the right in the left flash stereo image $F_l$ 411 instead of to the left as in the right flash stereo image $F_r$ 412.

$$dR = R_r(x+\Delta) - R_r(x) \qquad (Eq. 16)$$

$$dF = F_r(x+\Delta) - F_l(x+D+\Delta) \qquad (Eq. 17)$$

In the LRC technique, the estimated disparity for a pixel in the left flash stereo image $F_l$ 411 should be the opposite of the estimated disparity for the corresponding pixel in the right flash stereo image $F_r$ 412, as illustrated by Equation 18. If $D_l$ and $D_r$ are precisely estimated for a pixel in one stereo image and the corresponding pixel in the other stereo image, then a disparity error E(x) should approach zero. In one embodiment, if the disparity error E(x) is greater than a threshold limit, then the estimated disparity D(x) for a pixel x 501 may be labeled as unreliable (or occluded). For any such pixels, the estimated disparity may be calculated as an average of the estimated disparity from the left flash stereo image $F_l$ 411 and the estimated disparity from the right flash stereo image $F_r$ 412. In other embodiments, an occluded pixel will copy a disparity from a neighboring pixel with similar ratio value.

$$E(x) = |D_l(x) + D_r(x + D_l(x))| \qquad (Eq. 18)$$

Conventional stereo pixel-matching algorithms may have difficulties estimating an accurate disparity (D(x)) for pixels proximate to depth discontinuities. As window 505 in FIG. 5A shows, some of the pixels in window 505 are associated with a surface of the third object 453, which is located behind the first object 451 in relation to the left image sensor 201. However, a search window 510 centered on a corresponding disparate pixel in the right flash stereo image $F_r$ 412 may not include any pixels associated with the third object 453 due to the relative position of the objects with respect to the right image sensor 202. Conventional pixel-matching algorithms may fail to distinguish between the pixels of different objects located at different depths and, therefore, the conventional algorithm may determine that window 505 is not similar to the window 510 in the corresponding stereo image and the estimated disparity D, based on a different search window within the search extents, may be incorrect. By utilizing the ratio maps to weigh pixels associated with surfaces at different depths, the flash/no-flash pixel-matching algorithm described herein generates a more accurate disparity estimate for each pixel of a stereo image pair. Furthermore, the flash/no-flash pixel-matching algorithm does not require precise calibration of the flash device 330 because the ratio map is used to filter pixels for matching purposes and not for directly calculating a disparity estimate or depth value.

In one embodiment, stereo image pairs may be captured as part of a stereoscopic video. In such an embodiment, the motion of objects in the scene may be estimated by analyzing successive frames of stereoscopic video to generate estimated motion vectors associated with the various objects (i.e., sets of related pixels) in a scene. The pixel-matching algorithm described above may be enhanced by applying the estimated motion vectors to correct for small displacements of objects that occur between the point the no-flash stereo image pair is captured and the point the flash stereo image pair is captured. For example, the ratio values may be calculated based on pixels in the no-flash stereo image (i.e., 401, 402) that are offset from the given pixel position in the flash stereo image (i.e., 411, 412) by the estimated motion vector.

Filtering to Reduce Depth Quantization

The disparity map D(x) generated using the flash/no-flash pixel-matching algorithm, while more accurate than disparity maps generated using conventional pixel-matching algorithms, may still have poor precision for certain pixels based on local irregularities. However, typically, both disparity values and ratio values are locally linear for any planar surface. In other words, proximate points on the same surface will typically be located at roughly the same depth and therefore, should have similar disparity and ratio values. As a result, filtering the disparity maps generated with the flash/no-flash pixel-matching algorithm will generate a more robust depth map of the flash stereo image pair ($F_l$, $F_r$).

Figure 6A:
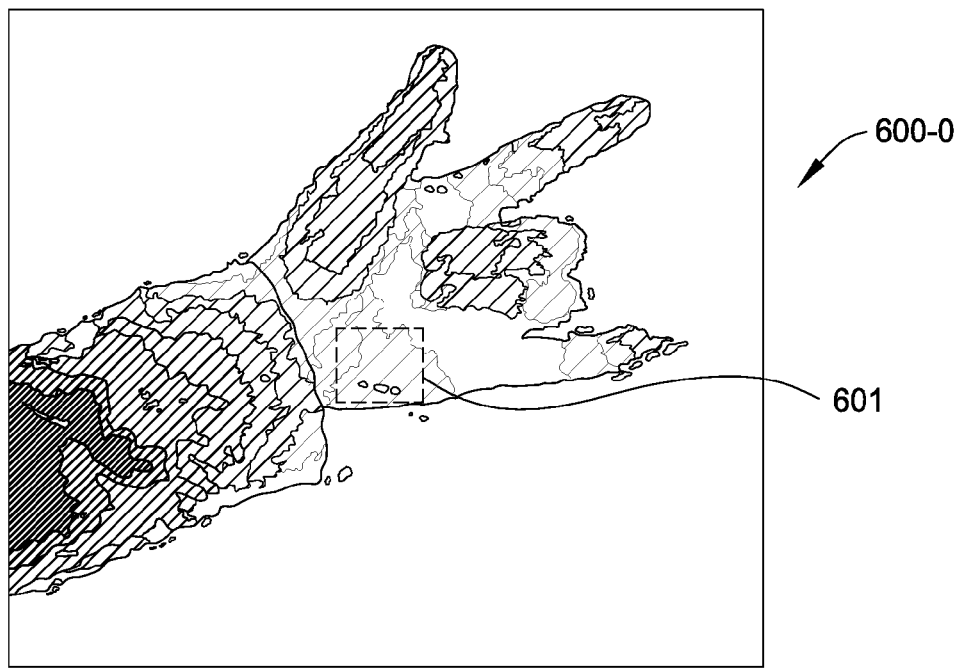
FIGS. 6A and 6B illustrate an iterative filtering algorithm for generating more robust depth maps, according to one embodiment of the present invention.
Figure 6B:
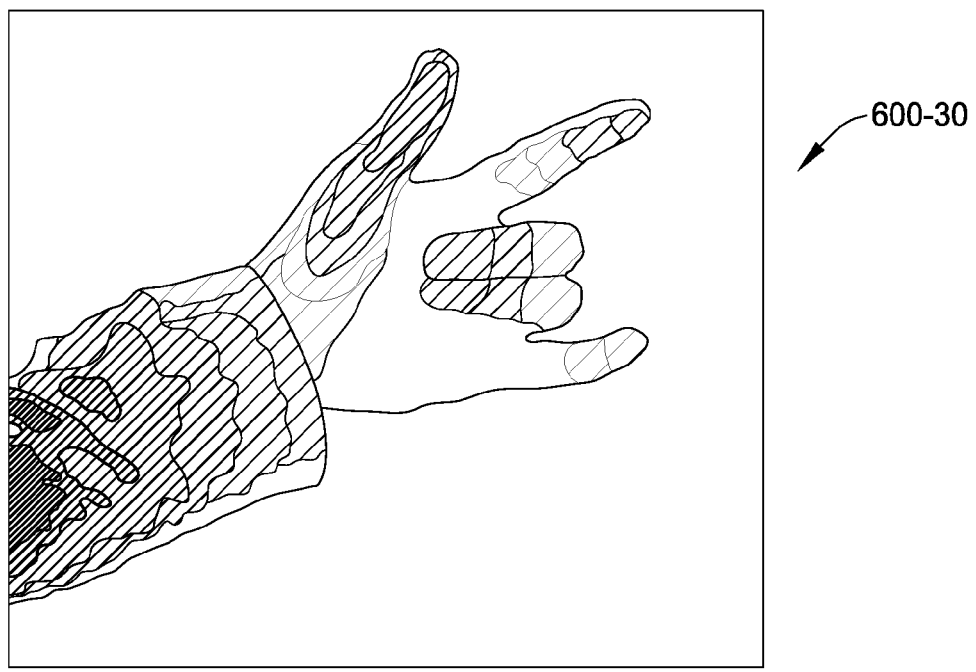

FIGS. 6A and 6B illustrate an iterative filtering algorithm for generating more robust depth maps, according to one embodiment of the present invention. FIG. 6A shows a disparity map 600-0 for a scene that includes a person's hand that is calculated according to the flash/no-flash pixel-matching algorithm set forth above. However, as FIG. 6A makes evident, the disparity map 600-0 includes local inconsistencies (e.g., 601) where the flash/no-flash pixel-matching algorithm appears to have incorrect disparity values for particular pixels. In one embodiment, the stereo-vision camera 300 may filter the original disparity map 600-0 based, at least in part, on a ratio map ($R_l$, $R_r$) to provide a more consistent and accurate disparity map associated with the flash stereo image pair ($F_l$, $F_r$). Equation 19, shown below, is implemented to filter disparity values for a pixel x, where Ω is the sum of all weights $W(x,\Delta)$ and τ is set to 2 (i.e., a 5 pixel by 5 pixel window), according to one example embodiment.

$$D^{i+1}(x) = \frac{1}{\Omega} \sum_{|\Delta|<\tau} W(x, \Delta) \cdot D^i(x+\Delta) \qquad \text{(Eq. 19)}$$

In other words, each pixel of the filtered disparity map is computed from a weighted sum of neighboring pixels in the original disparity map 600-0. The weights for each pixel position relative to a pixel x are given by equations 20, 21, and 22, shown below.

$$W(x,\Delta) = N_{\sigma_R}(\delta F(x)) \cdot N_{\sigma_D}(\delta D^i(x)) \cdot e^{-C(x+\Delta)} \qquad \text{(Eq. 20)}$$

$$\delta F(x) = F(x+\Delta) - F(x) \qquad \text{(Eq. 21)}$$

$$\delta D^i(x) = D^i(x+\Delta) - D^i(x) \qquad \text{(Eq. 22)}$$

The exponent term ($e^{-C(x+\Delta)}$) is the confidence level of the matching algorithm and is related to the cost value given by Equation 15 for a particular pixel x and estimated disparity D. In other words, a low cost value (i.e., good match confidence) for a given pixel x results in a larger weight than a pixel with a high cost value (i.e., poor match confidence). The basic idea of the weight calculation is that the depth information should flow from high confidence pixels to low confidence pixels. Again, the $N_{\sigma_R}$ and $N_{\sigma_D}$ coefficients are generated by Gaussian functions similar to Equations 13 or 14, as set forth above. Applying Equation 19 to the disparity map 600-0 generates a new filtered disparity map. The filter function of Equation 19 may be applied repeatedly over a number N of iterations to generate filtered results such as disparity map 600-30 (iterated 30 times), as shown in FIG. 6B. The iterative filtering algorithm effectively removes single pixel discontinuities that do not match the neighboring pixels.

Figure 7:
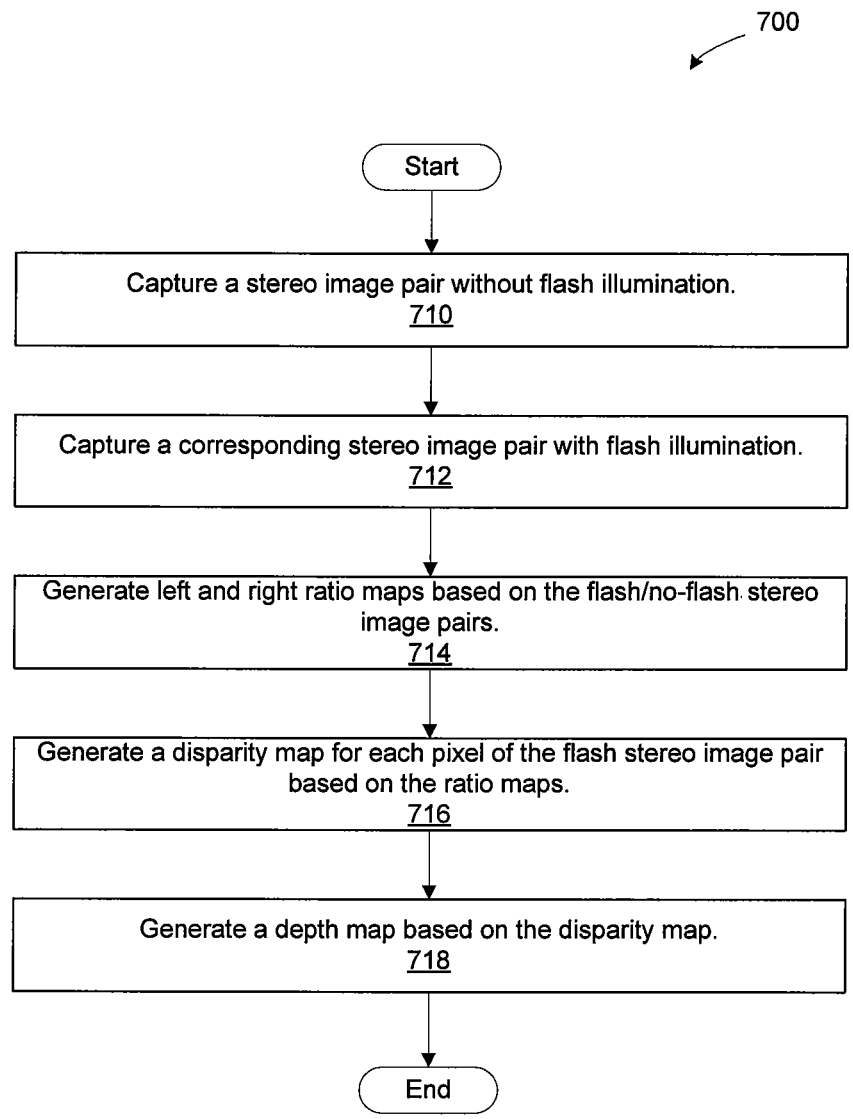
FIG. 7 is a flow diagram of method steps for generating a disparity map associated with a stereo image, according to one embodiment of the present invention.

FIG. 7 is a flow diagram of method steps for generating a disparity map associated with a stereo image, according to one embodiment of the present invention. Although the method steps are described in conjunction with the systems of FIGS. 1-6, persons of ordinary skill in the art will understand that any system configured to perform the method steps is within the scope of the present invention.

As shown, a method 700 begins at step 710, where stereo-vision camera 300 captures a stereo image pair $G_l$ 401, $G_r$ 402 without using flash illumination from flash device 330. Soon thereafter, at step 712, the stereo-vision camera 300 captures a stereo image pair $F_l$ 411, $F_r$ 412 using flash illumination from flash device 330. In some embodiments, more than two image sensors will be implemented to capture an n-tuple set of images with and without flash illumination.

At step 714, the stereo-vision camera 300 generates a set of ratio maps associated with the flash stereo images (e.g., $F_l$ 411, $F_r$ 412) captured with flash illumination. For each image in the set of flash stereo images, a ratio map is defined as the logarithm of the ratio of light intensity values for pixels in the flash stereo image to the light intensity values for pixels in the corresponding no-flash stereo image. In one embodiment, the ratio map is defined according to Equation 9, set forth above. The ratio map provides a coarse indication of depth for each pixel in the flash stereo images, where pixels at similar depths and orientations on similar surfaces have similar ratio values.

At step 716, the stereo-vision camera 300 generates a set of disparity maps associated with the flash stereo images and the corresponding ratio maps by implementing a flash/no-flash pixel-matching algorithm. For each image in the set of flash stereo images (e.g., $F_l$ 411, $F_r$ 412), a disparity map is defined as the set of estimated disparity values (D(x)) associated with the pixels in the flash stereo image. In one embodiment, each disparity value for a pixel corresponds with the minimum cost for a range of potential disparity values for the given pixel. The minimum cost may be derived by solving Equation 15, set forth above.

At step 718, the stereo-vision camera 300 generates a depth map based on at least one of the disparity maps. In one embodiment, the depth map may be computed by solving Equations 3 or 4 set forth above, given known focal length and baseline offset for the stereo-vision camera 300. Then, method 700 terminates.

Figure 8:
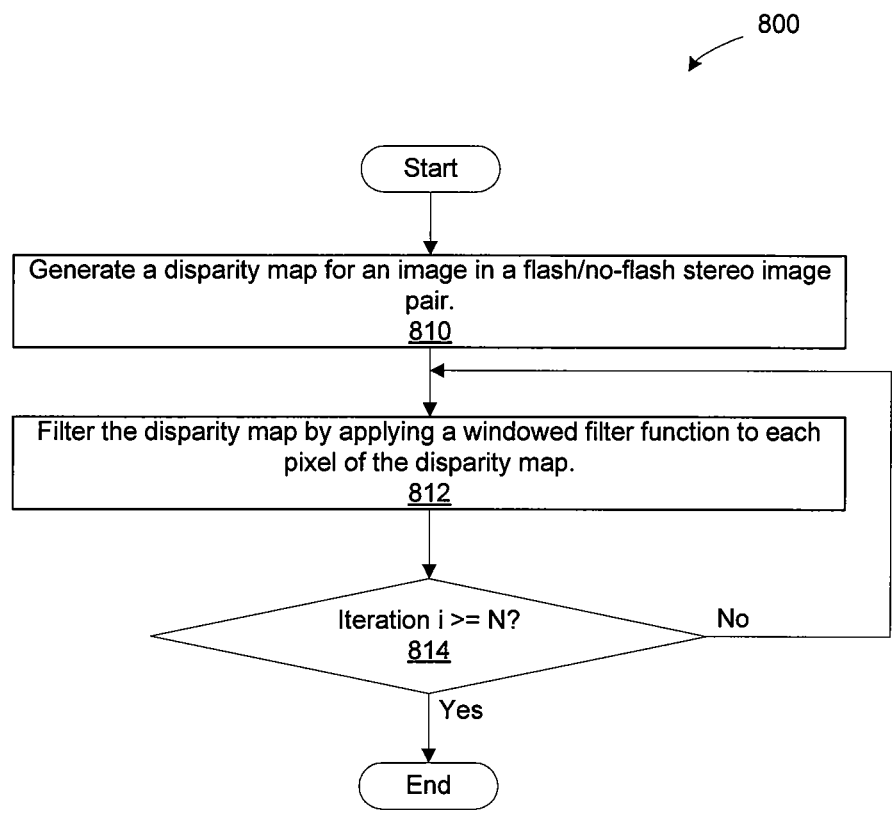
FIG. 8 is a flow diagram of method steps for generating a filtered disparity map associated with a flash stereo image, according to one embodiment of the present invention.

FIG. 8 is a flow diagram of method steps for generating a filtered disparity map associated with a flash stereo image, according to one embodiment of the present invention. Although the method steps are described in conjunction with the systems of FIGS. 1-6, persons of ordinary skill in the art will understand that any system configured to perform the method steps, in any order, is within the scope of the present invention.

As shown, a method 800 begins at step 810, where a disparity map for a flash stereo image is generated. For example, the disparity map may be generated by method 700. At step 812, the stereo-vision camera 300 filters the disparity map to generate a filtered disparity map. In one embodiment, the stereo-vision camera 300 implements the filter function according to Equation 19, set forth above, to filter the original disparity map. At step 814, stereo-vision camera 300 determines whether the number of completed iterations i is greater than or equal to a threshold N number of iterations. If i is less than N, then the method 800 returns to step 812 where stereo-vision camera 300 performs an additional iteration by filtering the filtered disparity map generated during the previous iteration and adds 1 to i. However, if i is greater than or equal to N, then method 800 terminates.

In sum, a robust depth map is generated from a set of stereo images captured with and without flash illumination. The depth map is more robust than depth maps generated using conventional techniques because a pixel-matching algorithm is implemented that weights pixels in a matching window according to the ratio of light intensity captured using different flash illumination. The ratio map provides a rough estimate of depth relative to neighboring pixels that enables the pixel-matching algorithm to devalue pixels that appear to be located at different depths than the central pixel in the matching window. One reason why the technique is robust at depth discontinuities is that the ratio image provides a matching constraint without directly involving neighboring pixels within the matching window. Traditional techniques only rely on intensity variations within the matching window, which are not as robust when some pixels within the matching window are associated with different background objects. Furthermore, the ratio map may be used to filter the generated disparity map to generate a smooth estimate of depth of objects within a stereo image.

One advantage of the disclosed system is that the stereo-vision camera does not require a high degree of calibration to generate robust depth maps. The technique described herein may be implemented in many low-cost handheld devices. Simply comparing the ratio of captured light intensity using different degrees of illumination provides depth information that can be used to effectively differentiate between pixels located at different depths in the pixel-matching algorithms.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed is:

1. A computer-implemented method for generating depth maps from a set of stereo images, the method comprising:
    generating a ratio map associated with a first image and a second image in the set of stereo images, wherein, for each pixel in the second image, the ratio map associates the pixel with a ratio of a first intensity value for the pixel based on the second image to a second intensity value for a corresponding pixel based on the first image, and wherein the first image is captured by a first image sensor using ambient illumination, and the second image is captured by the first image sensor using flash illumination;
    generating a disparity map associated with the second image wherein, for each pixel in the second image, the disparity map associates the pixel with a disparity value according to a pixel-matching algorithm that compares pixels in the second image to corresponding pixels in a fourth image in the set of stereo images, wherein the pixel-matching algorithm calculates at least one cost value for determining the disparity value, wherein the cost value is based, in part, on a difference between values of a ratio associated with the pixel and a ratio associated with an offset pixel in the second image that is offset from the pixel, and wherein a third image is captured by a second image sensor substantially simultaneously with the first image being captured by the first image sensor and the fourth image is captured by the second image sensor substantially simultaneously with the second image being captured by the first image sensor; and
    generating a depth map associated with the second image, wherein, for each pixel in the second image, the depth map associates the pixel with a depth value that is calculated based, in part, on the disparity value associated with the pixel.

2. The method of claim 1, wherein, for each pixel in the second image, generating the disparity map comprises:
    generating a disparity space image that includes a plurality of cost values calculated for a plurality of potential disparity values; and
    selecting a particular disparity value from the plurality of potential disparity values based on the plurality of cost values.

3. The method of claim 2, wherein selecting the particular disparity value comprises selecting, from the plurality of potential disparity values, a potential disparity value associated with a minimum cost value in the disparity space image.

4. The method of claim 1, further comprising:
    filtering the disparity map to generate a filtered disparity map associated with the second image,
    wherein, for each pixel in the second image, the filtered disparity map associates a filtered disparity value with the pixel,
    wherein the filtered disparity value is generated by calculating a weighted sum of a set of disparity values in the disparity map associated with a window of pixels proximate to the pixel, and
    wherein weight coefficients for each of the disparity values in the set of disparity values are related to a confidence level of the disparity value associated with that weight coefficient that is based on, at least in part, the ratio associated with the pixel.

5. The method of claim 4, further comprising, for N number of iterations, repeating the step of filtering to generate an N number of successively filtered disparity maps, wherein each successively filtered disparity map generated during a current iteration is generated by filtering a successively filtered disparity map generated during a previous iteration.

6. The method of claim 1, further comprising:
    generating a ratio map associated with the fourth image;
    generating a disparity map associated with the fourth image; and
    adjusting the depth map associated with the second image based on the disparity map associated with the second image and the disparity map associated with the fourth image.

7. The method of claim 6, further comprising:
    calculating a disparity error for a particular pixel in the second image based on a difference between the disparity value associated with the particular pixel in the disparity map associated with the second image and the disparity value associated with a corresponding pixel in the disparity map associated with the fourth image;
    determining that the disparity error for the particular pixel is above a threshold value; and
    labeling the particular pixel as occluded.

8. The method of claim 7, further comprising adjusting the disparity value associated with the particular pixel in the disparity map associated with the second image based on the disparity value associated with the corresponding pixel in the disparity map associated with the fourth image.

9. A non-transitory computer-readable storage medium including instructions that, when executed by a processing unit, cause the processing unit to perform operations for generating depth maps from a set of stereo images, the operations comprising:
    generating a ratio map associated with a first image and a second image in the set of stereo images, wherein, for each pixel in the second image, the ratio map associates the pixel with a ratio of a first intensity value for the pixel based on the second image to a second intensity value for a corresponding pixel based on the first image, and wherein the first image is captured by a first image sensor using ambient illumination, and the second image is captured by the first image sensor using flash illumination;

generating a disparity map associated with the second image wherein, for each pixel in the second image, the disparity map associates the pixel with a disparity value according to a pixel-matching algorithm that compares pixels in the second image to corresponding pixels in a fourth image in the set of stereo images, wherein the pixel-matching algorithm calculates at least one cost value for determining the disparity value, wherein the cost value is based, in part, on a difference between values of a ratio associated with the pixel and a ratio associated with an offset pixel in the second image that is offset from the pixel, and wherein a third image is captured by a second image sensor substantially simultaneously with the first image being captured by the first image sensor and the fourth image is captured by the second image sensor substantially simultaneously with the second image being captured by the first image sensor; and generating a depth map associated with the second image, wherein, for each pixel in the second image, the depth map associates the pixel with a depth value that is calculated based, in part, on the disparity value associated with the pixel.

10. The computer-readable storage medium of claim 9, wherein, for each pixel in the second image, generating the disparity map comprises:

generating a disparity space image that includes a plurality of cost values calculated for a plurality of potential disparity values; and selecting a particular disparity value from the plurality of potential disparity values based on the plurality of cost values.

11. The computer-readable storage medium of claim 10, wherein selecting the particular disparity value comprises selecting, from the plurality of potential disparity values, a potential disparity value associated with a minimum cost value in the disparity space image.

12. The computer-readable storage medium of claim 9, further comprising:

filtering the disparity map to generate a filtered disparity map associated with the second image, wherein, for each pixel in the second image, the filtered disparity map associates a filtered disparity value with the pixel, wherein the filtered disparity value is generated by calculating a weighted sum of a set of disparity values in the disparity map associated with a window of pixels proximate to the pixel, and wherein weight coefficients for each of the disparity values in the set of disparity values are related to a confidence level of the disparity value associated with that weight coefficient that is based on, at least in part, the ratio associated with the pixel.

13. The computer-readable storage medium of claim 12, further comprising, for N number of iterations, repeating the step of filtering to generate an N number of successively filtered disparity maps, wherein each successively filtered disparity map generated during a current iteration is generated by filtering a successively filtered disparity map generated during a previous iteration.

14. The computer-readable storage medium of claim 9, further comprising:

generating a ratio map associated with the fourth image;

generating a disparity map associated with the fourth image; and adjusting the depth map associated with the second image based on the disparity map associated with the second image and the disparity map associated with the fourth image.

15. The computer-readable storage medium of claim 14, further comprising:

calculating a disparity error for a particular pixel in the second image based on a difference between the disparity value associated with the particular pixel in the disparity map associated with the second image and the disparity value associated with a corresponding pixel in the disparity map associated with the fourth image;

determining that the disparity error for the particular pixel is above a threshold value; and labeling the particular pixel as occluded.

16. The computer-readable storage medium of claim 15, further comprising adjusting the disparity value associated with the particular pixel in the disparity map associated with the second image based on the disparity value associated with the corresponding pixel in the disparity map associated with the fourth image.

17. A system for generating depth maps from a set of stereo images, the system comprising:

a memory configured to store the set of stereo images captured by two or more image sensors, wherein the set of stereo images includes a first image that is captured by a first image sensor using ambient illumination, a second image that is captured by the first image sensor using flash illumination, a third image that is captured by a second image sensor substantially simultaneously with the first image being captured by the first image sensor, and a fourth image that is captured by the second image sensor substantially simultaneously with the second image being captured by the first image sensor; and a processor coupled to the memory and configured to:

generate a ratio map associated with a first image and a second image in the set of stereo images, wherein, for each pixel in the second image, the ratio map associates the pixel with a ratio of a first intensity value for the pixel based on the second image to a second intensity value for a corresponding pixel based on the first image, generate a disparity map associated with the second image wherein, for each pixel in the second image, the disparity map associates the pixel with a disparity value according to a pixel-matching algorithm that compares pixels in the second image to corresponding pixels in the fourth image in the set of stereo images, wherein the pixel-matching algorithm calculates at least one cost value for determining the disparity value, wherein the cost value is based, in part, on a difference between values of a ratio associated with the pixel and a ratio associated with an offset pixel in the second image that is offset from the pixel, and generate a depth map associated with the second image, wherein, for each pixel in the second image, the depth map associates the pixel with a depth value that is calculated based, in part, on the disparity value associated with the pixel.

18. The system of claim 17, wherein, for each pixel in the second image, generating the disparity map comprises:

generating a disparity space image that includes a plurality of cost values calculated for a plurality of potential disparity values; and selecting a particular disparity value from the plurality of potential disparity values based on the plurality of cost values.

19. The system of claim 17, the processor further configured to:

filter the disparity map to generate a filtered disparity map associated with the second image, wherein, for each pixel in the second image, the filtered disparity map associates a filtered disparity value with the pixel, wherein the filtered disparity value is generated by calculating a weighted sum of a set of disparity values in the disparity map associated with a window of pixels proximate to the pixel, and wherein weight coefficients for each of the disparity values in the set of disparity values are related to a confidence level of the disparity value associated with that weight coefficient that is based on, at least in part, the ratio associated with the pixel.

20. The system of claim 17, further comprising:

a stereo-vision camera coupled to the memory and the processor, wherein the stereo-vision camera includes the first image sensor, the second image sensor, a first lens associated with the focal length and mounted in front of the first image sensor, a second lens associated with the focal length and mounted in front of the second image sensor, and a flash device, wherein the processor is further configured to:

sample the first image sensor and the second image sensor to generate the set of stereo images, and cause the set of stereo images to be stored in the memory.

21. The method of claim 1, wherein the offset pixel is within a window having a predetermined pixel size that is centered on the pixel.

* * * * *